(12) United States Patent
Halsey (10) Patent No.: US 10,547,183 B2
(45) Date of Patent: Jan. 28, 2020

(54) HIGH VOLTAGE BATTERY PACK AND METHODS OF MANUFACTURE

(71) Applicant: GE Aviation Systems Limited, Gloucestershire (GB)

(72) Inventor: Colin John Halsey, Cheltenham (GB)

(73) Assignee: GE Aviation Systems Limited, Gloucestershire (GB)

( * ) Notice: Subject to any disclaimer, the term of this patent is extended or adjusted under 35 U.S.C. 154(b) by 61 days.

(21) Appl. No.: 15/988,652

(22) Filed: May 24, 2018

(65) Prior Publication Data

US 2018/0366958 A1 Dec. 20, 2018

(30) Foreign Application Priority Data

Jun. 15, 2017 (GB) .................................. 1709545.6

(51) Int. Cl.
*H02J 7/00* (2006.01)
*B64D 31/14* (2006.01)
*H01M 10/44* (2006.01)
*H01M 10/42* (2006.01)

(52) U.S. Cl.
CPC ............ *H02J 7/0026* (2013.01); *B64D 31/14* (2013.01); *H01M 10/425* (2013.01); *H01M 10/441* (2013.01); *H02J 7/0047* (2013.01)

(58) Field of Classification Search
CPC .................................................. H02J 7/0026
USPC ........................................................ 320/112
See application file for complete search history.

(56) References Cited

U.S. PATENT DOCUMENTS

| | | | | |
|---|---|---|---|---|
| 6,639,385 B2* | 10/2003 | Verbrugge | ......... | G01R 31/3835 320/132 |
| 6,891,352 B2* | 5/2005 | Miyazaki | ................ | B60L 50/64 320/118 |
| 7,009,401 B2* | 3/2006 | Kinoshita | ............. | H01M 10/48 324/430 |
| 7,248,020 B2* | 7/2007 | Hidaka | ............ | G01R 19/16542 320/134 |

(Continued)

FOREIGN PATENT DOCUMENTS

| | | |
|---|---|---|
| WO | 2012026093 A1 | 3/2012 |
| WO | 2014198183 A1 | 12/2014 |
| WO | 2016095129 A1 | 6/2016 |

OTHER PUBLICATIONS

Great Brittan Search Report issued in connection with corresponding GB application No. 1709545.6 dated Dec. 22, 2017.

*Primary Examiner* — Yalkew Fantu
(74) *Attorney, Agent, or Firm* — McGarry Bair, P.C.

(57) ABSTRACT

A high voltage battery pack includes a set of battery bricks, wherein the battery bricks each have a positive and a negative terminal. Each battery brick is connected in series or in parallel to an adjacent battery brick to generate a total voltage of the battery pack. A battery pack lower assembly holds the battery bricks. A battery pack upper assembly includes a battery pack upper housing and a circuit board connected to the battery pack upper housing, the circuit board having brick connectors attached thereto. The brick connectors are positioned to come into physical contact with the positive and negative terminals of the battery bricks to generate the total voltage of the battery pack, and the battery pack upper housing defines a physical separation distance between the brick connectors and an exterior of the battery pack upper housing.

20 Claims, 9 Drawing Sheets

(56) References Cited

U.S. PATENT DOCUMENTS

| | | |
|---|---|---|
| 7,683,575 B2 | 3/2010 | Berdichevsky et al. |
| 8,618,775 B2 | 12/2013 | Hermann et al. |
| 2004/0212342 A1 | 10/2004 | Batson |
| 2009/0139781 A1 | 6/2009 | Straubel |
| 2012/0003507 A1* | 1/2012 | Krieg .................. H01M 2/1016 429/7 |
| 2012/0129041 A1 | 5/2012 | Komazawa |
| 2013/0002017 A1 | 1/2013 | Yano et al. |
| 2014/0212695 A1* | 7/2014 | Lane ..................... H01M 2/204 429/7 |
| 2015/0303527 A1 | 10/2015 | Maxwell |
| 2016/0254576 A1 | 9/2016 | Burns |

* cited by examiner

HIGH VOLTAGE BATTERY PACK AND METHODS OF MANUFACTURE

BACKGROUND OF THE INVENTION

Contemporary aircraft incorporate an electrical power system to generate and distribute electrical power to various loads throughout the aircraft. The power sources for the electrical power system include, but are not limited to, one or more generators powered by the main engines, batteries or battery packs, an auxiliary power unit, and a ram air turbine.

To improve the efficiency of the electrical power systems, higher DC voltages can be used as the backbone of the system. To accommodate these developments batteries or battery packs with higher voltage at their output terminals can be used.

The battery pack can be a low voltage source or a high voltage source. Battery packs can include one or more cell stacks configured in parallel and series combinations to achieve a desired operating voltage and current capacity.

BRIEF DESCRIPTION OF THE INVENTION

In one aspect, the present disclosure relates to a high voltage battery pack comprising a set of battery bricks, wherein the battery bricks each have a positive and a negative terminal and each is connected in series or in parallel to an adjacent battery brick to generate a total voltage of the battery pack, a battery pack lower assembly within which the battery bricks are attached, and a battery pack upper assembly, the battery pack upper assembly comprising a battery pack upper housing and a circuit board connected to the battery pack upper housing, the circuit board having brick connectors attached thereto, the brick connectors positioned to come into physical contact with the positive and negative terminals of the battery bricks to generate the total voltage of the battery pack, wherein the battery pack upper housing defines a physical separation distance between the brick connectors and an exterior of the battery pack upper housing, wherein the physical separation distance is within a range of 25 millimeters to 125 millimeters.

In another aspect, the present disclosure relates to a method of assembling a high voltage battery pack having a set of battery bricks connected in series or in parallel to generate a total voltage of the battery pack, the method comprising assembling the set of battery bricks to a battery pack lower housing to form a battery pack lower assembly, assembling a circuit board having brick connectors attached thereto to a battery pack upper housing to form a battery pack upper assembly, and joining the battery pack lower assembly to the battery pack upper assembly such that when the battery bricks come into physical contact with the brick connectors, the total voltage of the battery pack is generated, wherein the battery pack upper housing defines a physical separation distance such that when the battery pack upper housing is placed on the battery bricks, an operator is prevented from making physical contact with the brick connectors at or after the brick connectors have come into physical contact with the battery bricks to generate the total voltage of the battery pack.

DETAILED DESCRIPTION OF THE INVENTION

On an aircraft the electrical power distribution system services various consumer loads around the aircraft. Power can be routed from the electrical power source to the electrical loads. Traditional aircraft have used lower voltage batteries or battery packs as an electrical power source, such as a 28V battery source. These battery sources can be used for a variety of purposes on the aircraft, including, but not limited to, providing power to start the aircraft, fill-in for electrical busses, or as part of emergency systems. On modern aircraft the increased number of services demands more power in the electrical systems, which requires higher capacity batteries to support these demands. In order to provide the increased power while minimizing weight of the electrical systems, high voltage DC battery sources can be used, such as 270 V DC or 540 V DC. However, the manufacture of such high voltage battery packs can present safety challenges not encountered in the manufacture of low voltage battery packs. Aspects of the disclosure describe a beneficial method of manufacturing a battery pack that has improved safety even at high voltage power levels.

While "a set of" various elements will be described in aspects of this disclosure, it will be understood that "a set" can include any number of the respective elements, including only one element. Additionally, all directional references (e.g., radial, axial, upper, lower, upward, downward, left, right, lateral, front, back, top, bottom, above, below, vertical, horizontal, clockwise, counterclockwise) are used only for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected or in fixed relation to each other. The exemplary drawings are for purposes of illustration only and any dimensions, positions, order, and relative sizes reflected in the drawings attached hereto can vary.

Figure 1:
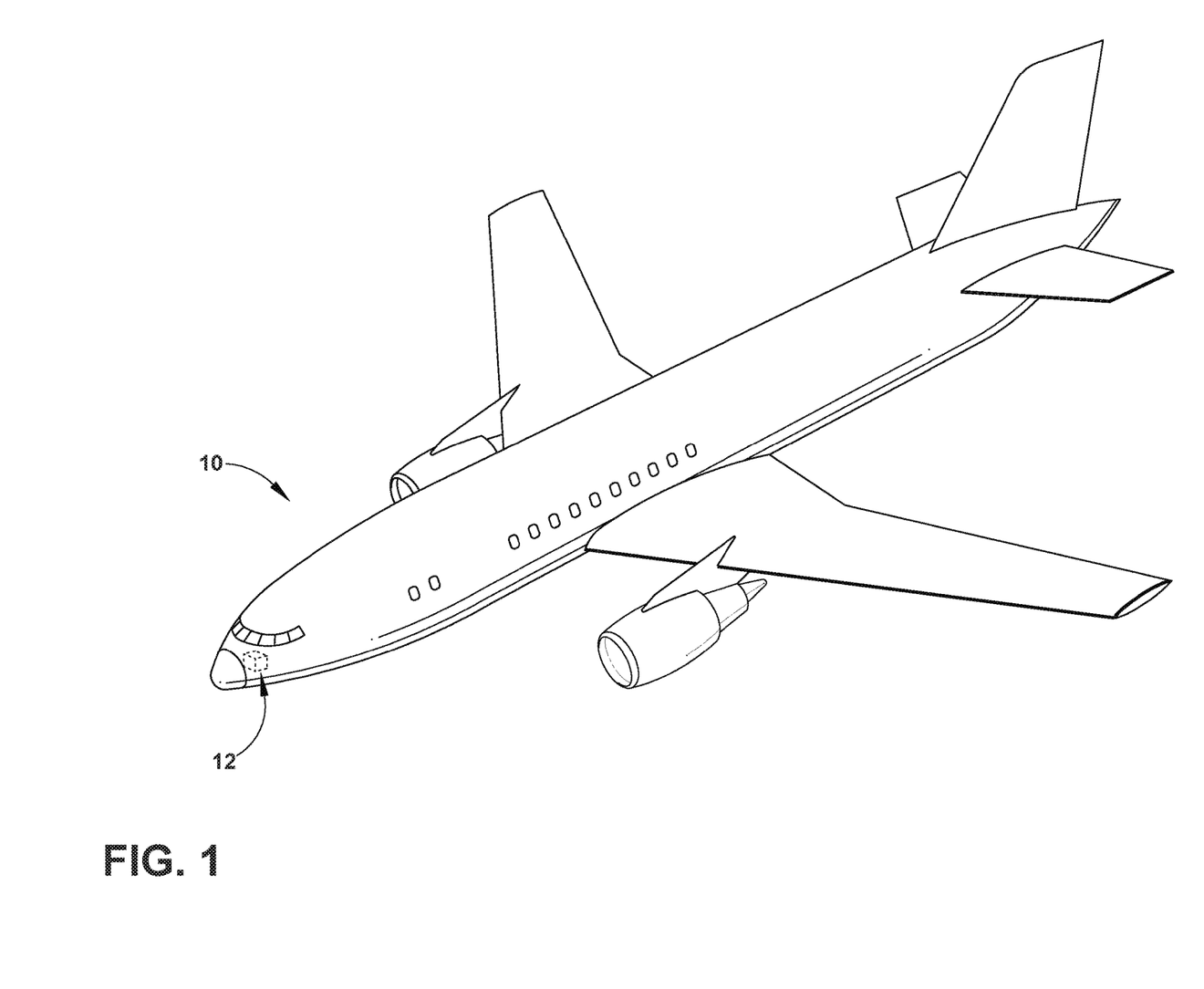
FIG. 1 is a perspective view of an aircraft having a power distribution panel in accordance with various aspects described herein.

FIG. 1 schematically illustrates an aircraft 10 with an on-board power distribution panel 12 (shown in dashed line). The power distribution panel 12 can house a variety of avionics elements and protect them against contaminants and vibrations. It will be understood that the power distribution panel 12 can be located anywhere within the aircraft 10, not just the nose as illustrated. For example, there can be any number of power distribution panels distributing power around the aircraft 10. While illustrated in a commercial airliner, the power distribution panel 12 can be used in any type of aircraft, for example, without limitation, fixed-wing, rotating-wing, rocket, commercial aircraft, personal aircraft, and military aircraft. Furthermore, aspects of the disclosure are not limited only to aircraft aspects, and can be included in other mobile and stationary configurations. Non-limiting example mobile configurations can include ground-based, water-based, or additional air-based vehicles. Any implementation has its own space constraints and power requirements. As such, the design of the particular aspects of the power distribution panel 12 and the contents it can house as described herein can be tailored to suit specific installation requirements of the implementation.

Figure 2:
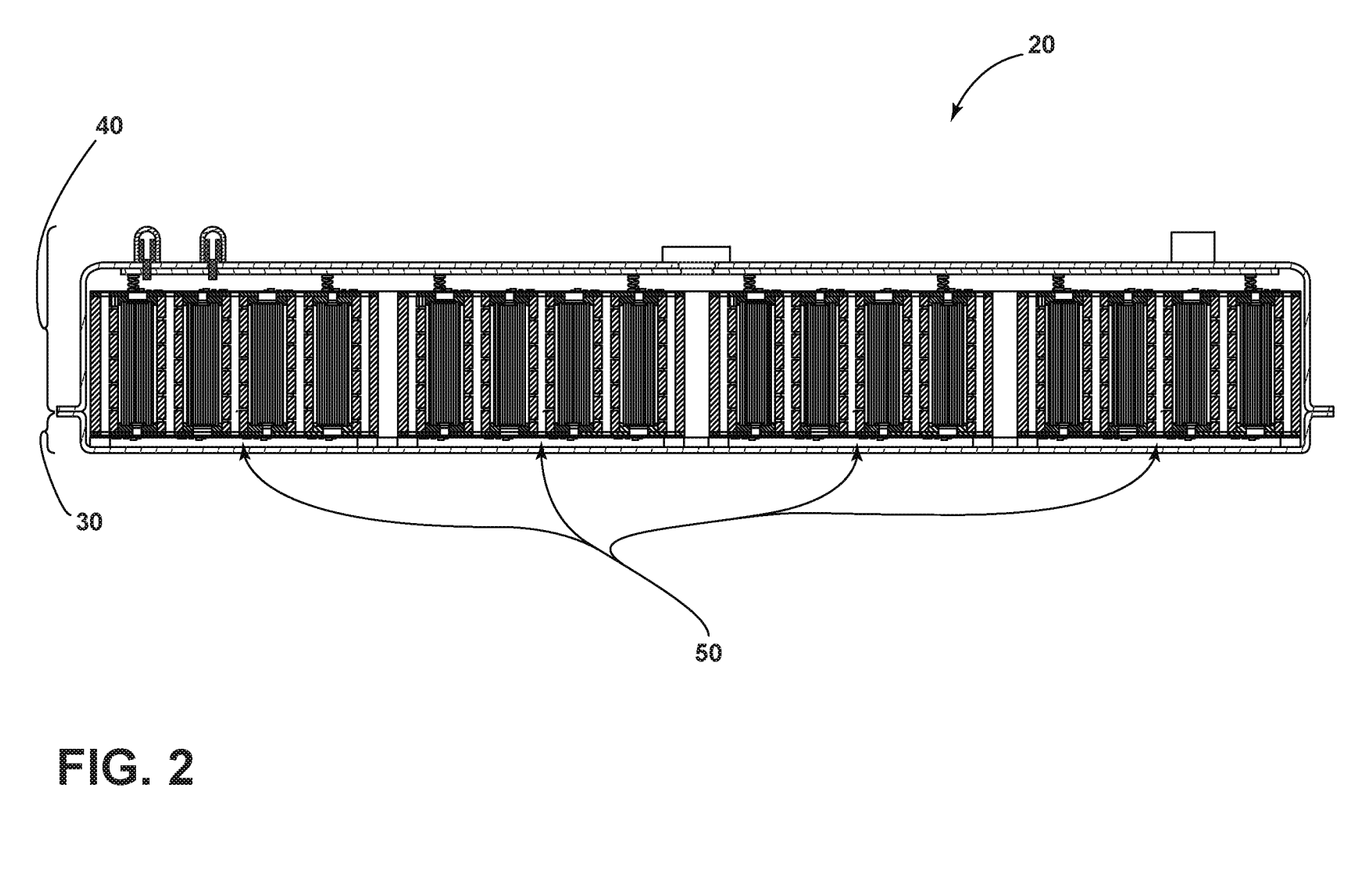
FIG. 2 is a cross-sectional view of an exemplary battery pack that can be utilized in the aircraft of FIG. 1, in accordance with various aspects described herein.

FIG. 2 illustrates a cross-sectional view of an exemplary power source that can be utilized in the power distribution panel 12 of an aircraft 10, illustrated herein as a battery pack 20. The battery pack 20 comprises a battery pack lower assembly 30 attached to a battery pack upper assembly 40. Contained within the battery pack 20 are a set of battery sub-assemblies, illustrated herein as bricks 50. Each brick 50 can be a fully individually testable power source. By combining a set of bricks 50 to make a battery pack 20, the battery pack 20 can have any suitable number of bricks 50 so as to produce the desired total voltage and power required for the battery pack 20. The number of bricks 50 that are integrally contained within the battery pack 20 can be selected based on the system requirements for the battery pack 20 of voltage, energy levels, and peak current output. This allows for a flexible system in which battery packs 20 of differing terminal voltage, current output, and capacity can be formed using the same basic structure and method, but with any desired number or configuration of bricks 50.

Figure 3:
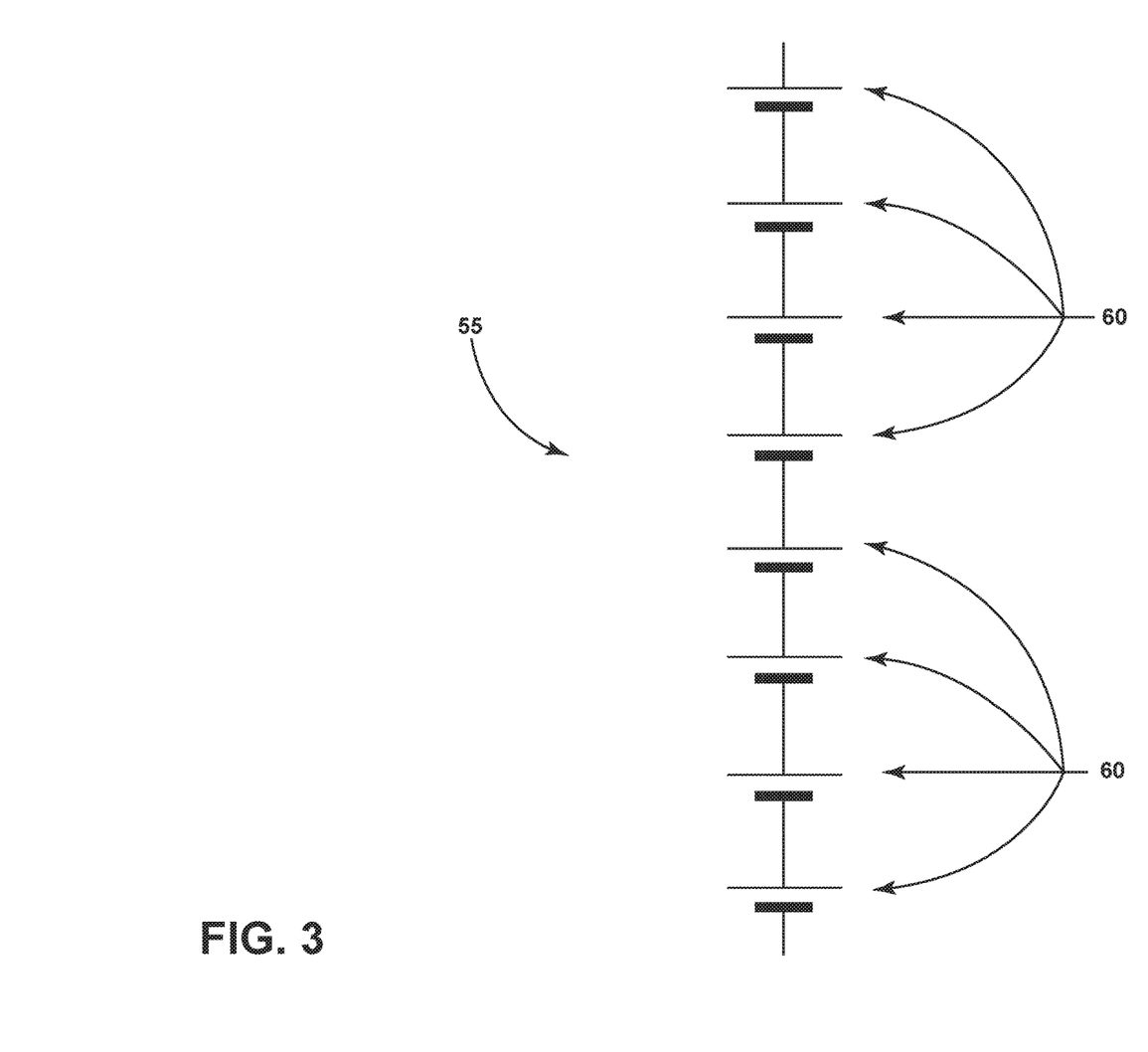
FIG. 3 is a schematic view of a cell string that can be utilized in the battery pack of FIG. 2, in accordance with various aspects described herein.

Referring now to FIG. 3, a schematic view of a cell string 55 is illustrated. Each brick 50 in the battery pack 20 comprises a set of battery cells 60 that are connected in series to form a cell string 55. The battery cells 60 connected to form a cell string 55 can generate an operating voltage of the cell string 55. In an exemplary embodiment, the battery cells 60 that form the cell string 55 can be commercially available batteries of a lithium-ion composition. Alternately, each battery cell 60 can be of alkaline, nickel-metal-hydride, or some other composition known in the art. A non-limiting example of such a suitable commercially available battery is a standard lithium-ion 18650 or 21700 battery. However, it will be understood that the concept of forming a cell string 55 from a set of battery cells 60 is applicable to a wide variety of other battery technologies and sizes. The battery cells 60 of an exemplary embodiment can be of lithium-ion composition, each rated at about 3.6 volts. Any suitable number of battery cells 60 can be connected in series to form the cell string 55. By way of non-limiting example, as shown in FIG. 3, eight lithium-ion battery cells 60 that are rated at about 3.6 volts and 3.2 ampere hours capacity each can be connected in series to produce a cell string 55 having a total operating voltage of about 28.8 volts and a total capacity of 3.2 ampere hours. If it is desired to form a higher voltage cell string 55, a larger number of battery cells 60 can be included.

Each of the battery cells 60 provided within the cell string 55 can be subject to a power management system which can provide both passive and active management for each of the battery cells 60. Such management can include, but is not limited to, functions related to the cooling and venting of the battery cells 60 and cell monitoring by a communication system. Necessary electronics can also be provided the monitor and control the cells, which can include circuitry to isolate and by pass a battery cell 60 if and when the management system indicates that a battery cell 60 has been compromised.

Figure 4:
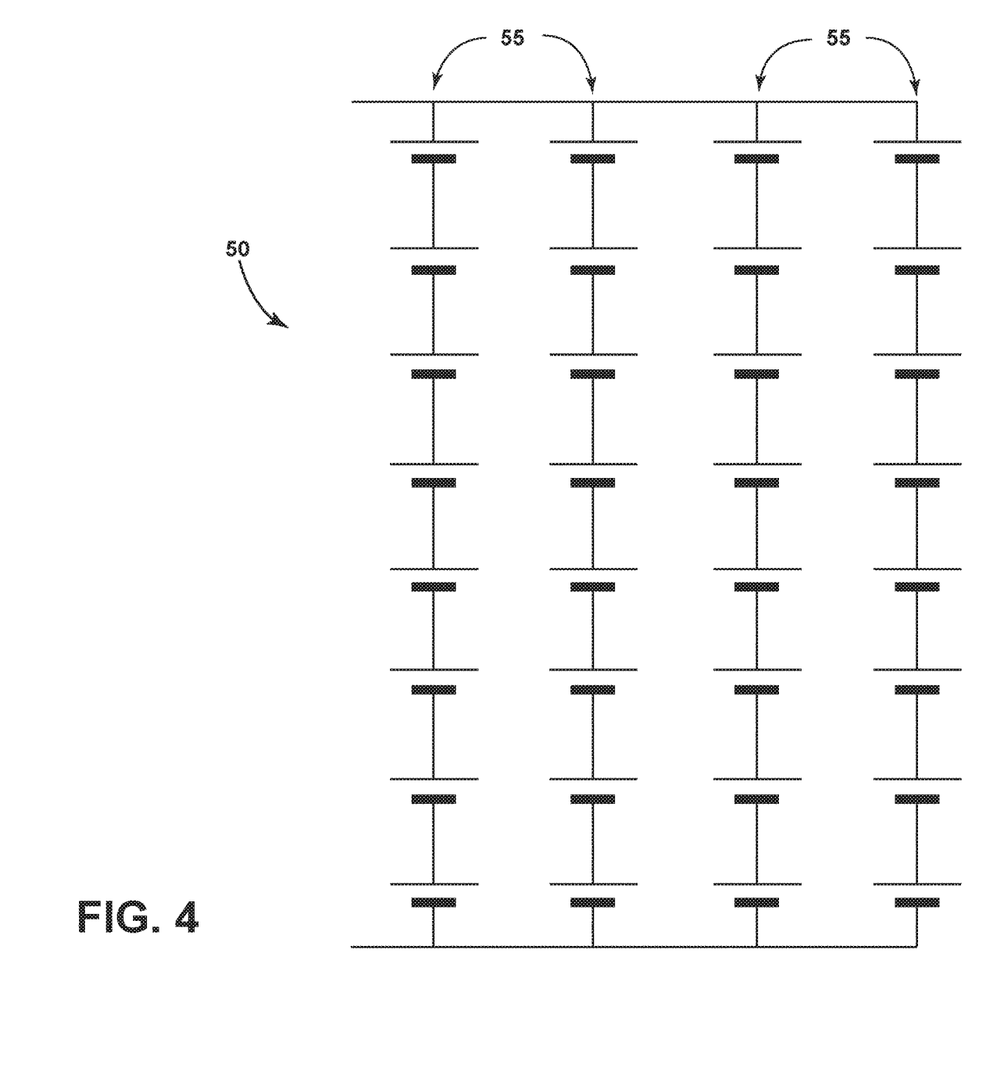
FIG. 4 is a schematic view of a brick that can be utilized in the battery pack of FIG. 2 in accordance with various aspects described herein.

FIG. 4 illustrates a schematic view of a brick 50 comprising a set of cell strings 55. When the current or capacity desired for a brick 50 exceeds that provided by a single cell string 55, a set of cell strings 55 can be connected to one another in parallel to form an integrated brick 50. By connecting a set of cell strings 55 in parallel, the maximum current and the storage capacity of the brick 50 is increased as compared to the use of a single cell string 55. As described in the example above, if each cell string 55 includes eight battery cells 60 that are each rated at about 3.6 volts, the total voltage of each cell string 55 would be about 28.8 volts and the total capacity would be about 3.2 ampere hours. Further by way of non-limiting example, as shown in FIG. 4, if four cell strings 55 having a total voltage of 28.8 volts and a total capacity of 3.2 ampere hours per cell string 55 are connected in parallel, the resulting brick 50 would maintain a total voltage of 28.8 volts while the capacity of the brick 50 will have increased to 12.8 ampere hours.

Figure 5:
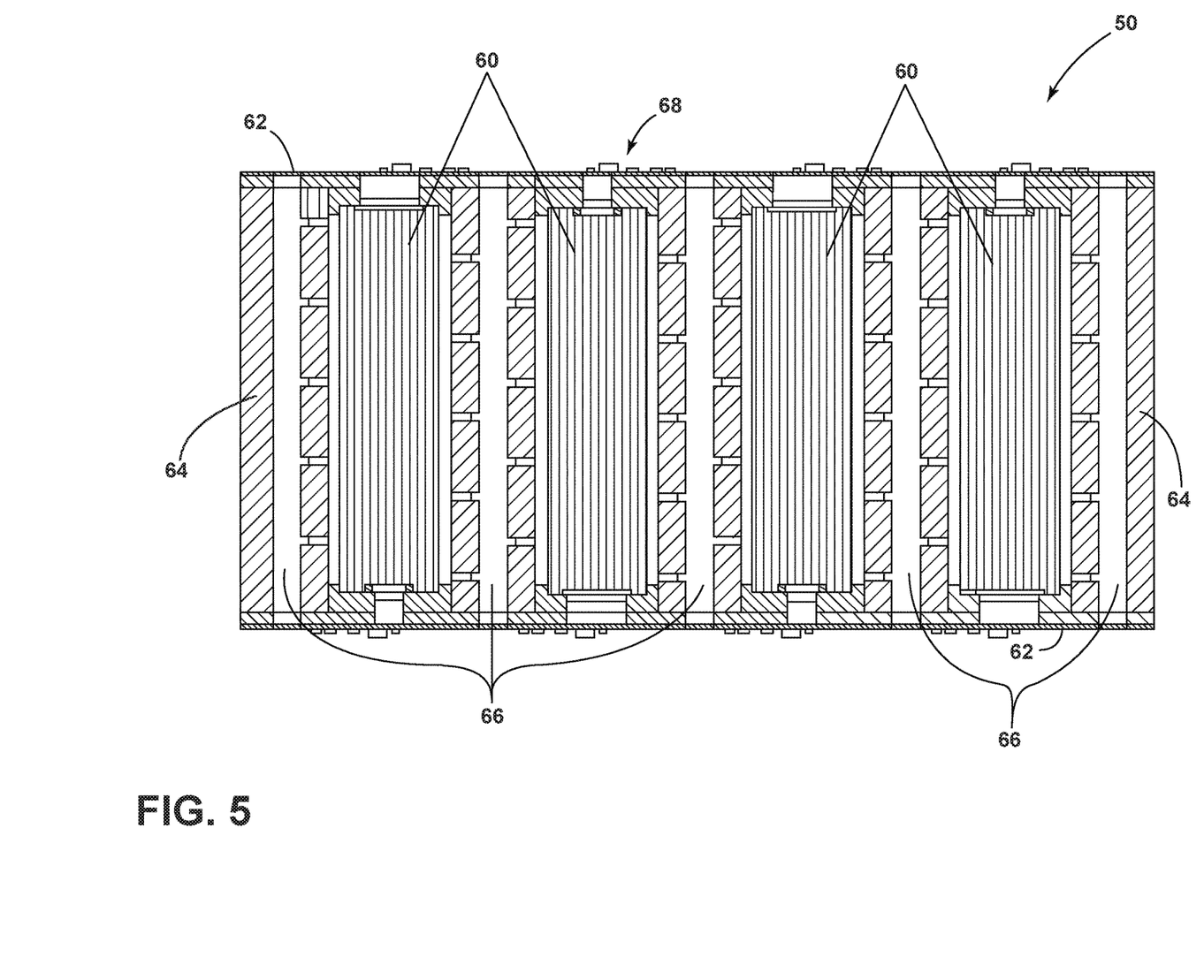
FIG. 5 is a cross-sectional view of a brick that can be utilized in the battery pack of FIG. 2 in accordance with various aspects described herein.

FIG. 5 illustrates a cross-sectional view of a portion of the brick 50 that is schematically illustrated in FIG. 4. The brick 50 is defined by a chassis 64 in which the battery cells 60 are received. In one non-limiting aspect of the disclosure, the chassis 64 can include a non-conductive material. Cell interconnectivity plates 62 can also be included. The cell interconnectivity plates 62 can be either attached to or integrated with the chassis 64. The cell interconnectivity plates 62 can be formed at least partially of any suitable conductive material and provide electrical connectivity between the individual battery cells 60. The chassis 64 can further define a plurality of channels 66. In an exemplary embodiment, the channels 66 extend between adjacent battery cells 60 for a cooling air to pass therethrough. The channels 66 thus serve as cooling and venting channels 66 in order to maintain an appropriate desired temperature within the chassis 64 and the brick 50 and to provide a venting path in the case of a failed cell. Electronics 68 can also be provided with the brick 50. These electronics 68 provide the management for the battery cells 60. By way of non-limiting example, the electronics 68 can include battery cell 60 monitoring features, charging circuits, fuses, thermal management control, and cell failure mitigation features.

Figure 6:
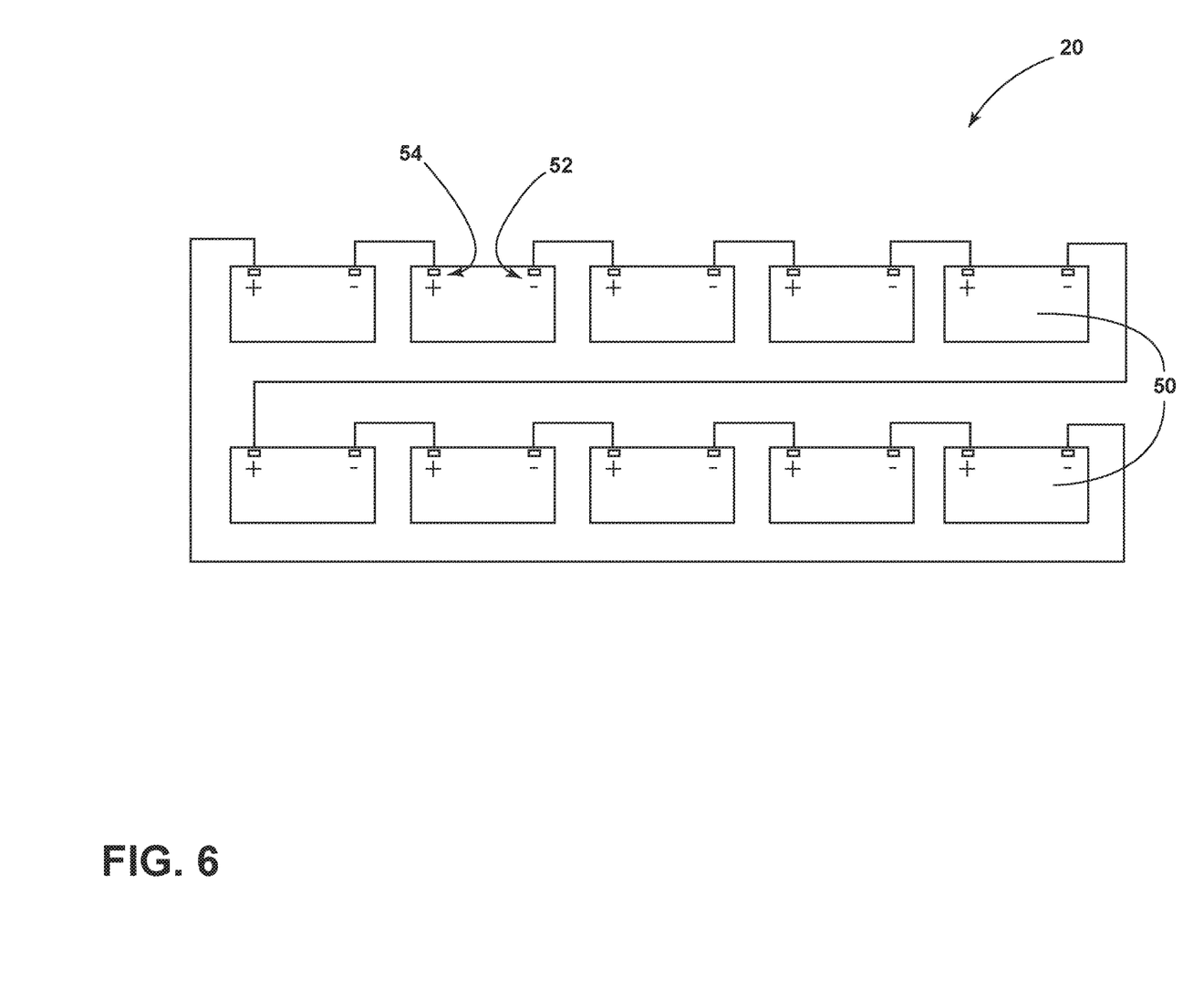
FIG. 6 is a schematic view of the battery pack of FIG. 2.

FIG. 6 illustrates a schematic view of the battery pack 20 comprising a set of bricks 50. Each brick 50, following the example described previously, can have a total voltage of 28.8 volts and a total capacity of 12.8 ampere hours. The brick 50 further comprises a negative terminal 52 and a positive terminal 54. Because each brick 50 can have a total voltage of 28.8 volts, each brick 50 taken alone does not produce a voltage that would be considered hazardous in an assembly or a manufacturing context. Additionally, each brick 50 can serve as a standalone unit to produce power, allowing the bricks 50 to be fully testable on their own, prior to being assembled into the full battery pack 20. This allows for testing to occur at non-hazardous voltage levels on each brick 50 to determine that the brick 50 is functioning properly prior to assembly into the battery pack 20.

Just as the individual battery cells 60 and the cell strings 55 can be connected to one another in series or in parallel, so can the bricks 50 be connected either in series or in parallel to form the battery pack 20. When increased voltage is desired, the bricks 50 can be connected in series. Additionally or alternately, when increased capacity or current output is desired, the bricks 50 can be connected in parallel. By way of non-limiting example, as shown in FIG. 6, ten bricks 50, each brick 50 having a total voltage of 28.8 volts and a total capacity of 12.8 ampere hours, can be connected in series to form a battery pack 20 having a total voltage of 288 volts and a total capacity of 12.8 ampere hours. At the point when the bricks 50 have been assembled into a battery pack 20 and the connections between the bricks 50 have been completed that the battery pack 20 has the capability of producing potentially hazardous voltages.

The battery pack 20 further comprises support functionality for the bricks 50. The support functionality of the battery pack 20 can include a variety of functions, including, but not limited to, environment regulation including heating as well as cooling, a battery pack 20 controller to manage the bricks 50, the ability to receive and store monitored data, such as diagnostics, health monitoring, and battery life predictions, a power supply unit for cell chargers, and system protection, such as a fuse. Air flow can be provided, for example, for cooling of the battery pack 20 and the bricks 50, and also for providing exhaust gas removal in the event of a cell or brick failure. Such air flow can be provided, by way of non-limiting example, by a fan or a forced air input and a plenum that directs the air to flow through the bricks 50 and out the bottom of the battery pack 20.

Figure 7:
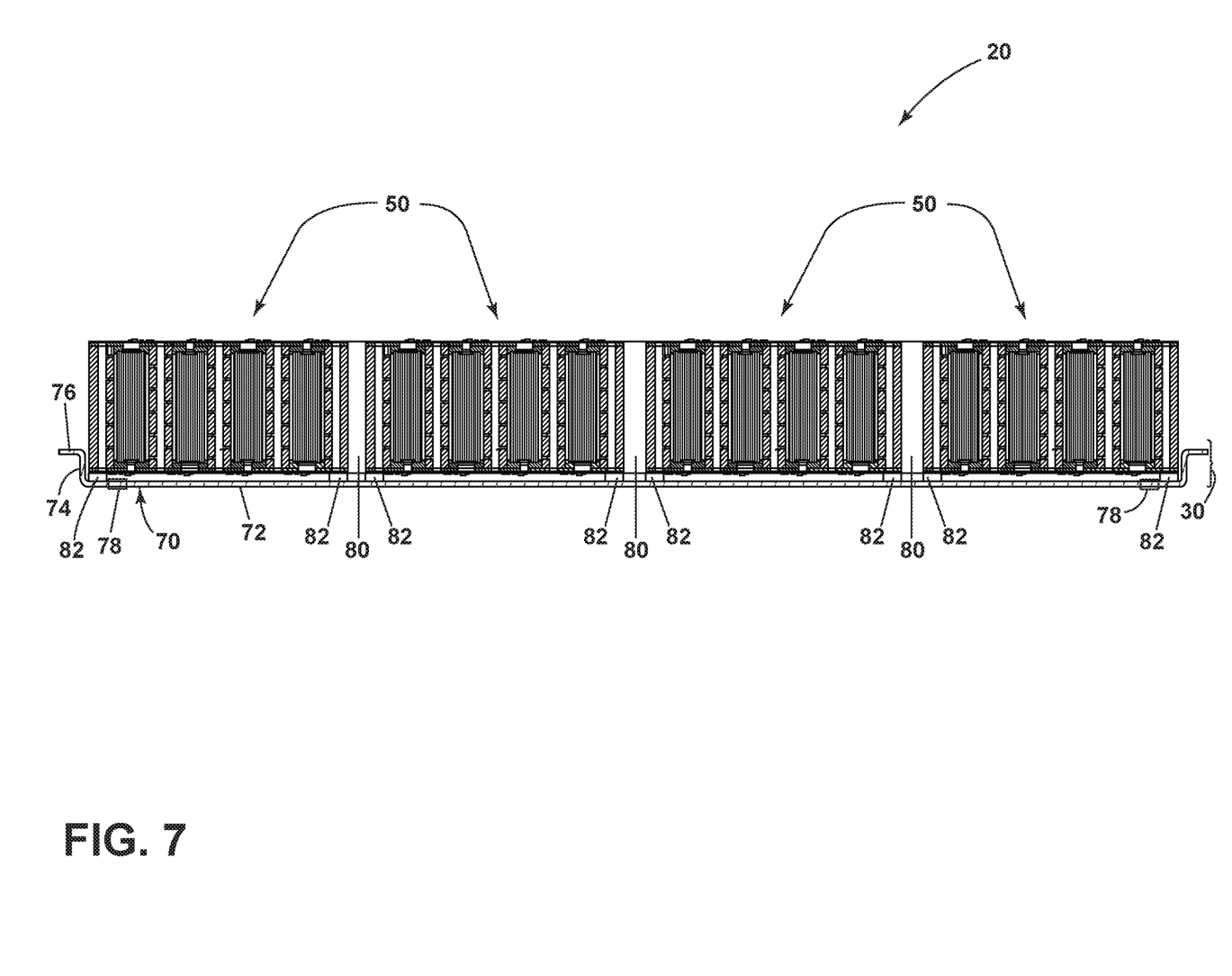
FIG. 7 is a cross-sectional view of a battery pack lower assembly of the battery pack of FIG. 2.

Referring now to FIG. 7, a cross-sectional view of the battery pack lower assembly 30 of the battery pack 20 is shown. The battery pack lower assembly 30 comprises the set of bricks 50 that are attached to a battery pack lower housing 70. The battery pack lower housing 70 defines a base 72 that serves as the attachment surface for the bricks 50. A lower housing sidewall 74 extends upwardly from the base 72, at an angle generally perpendicular to the base 72. A lower housing flange 76 extends generally horizontally outward from the lower housing sidewall 74. The base 72 of the battery pack lower housing 70 can further comprise at least one exhaust vent 78 to allow air flow into and out of the battery pack 20. The bricks 50 rest on the base 72. Supports 82 can be provided on the base 72 that the bricks 50 can rest on, rather than resting directly on the base 72. The supports 82 can be used to lift the bricks 50 off of the base 72, which can further allow air flow and thermal management of the bricks 50 and the battery pack 20. Firewalls 80 can also be provided between each of or between a portion of the bricks 50.

Figure 8:
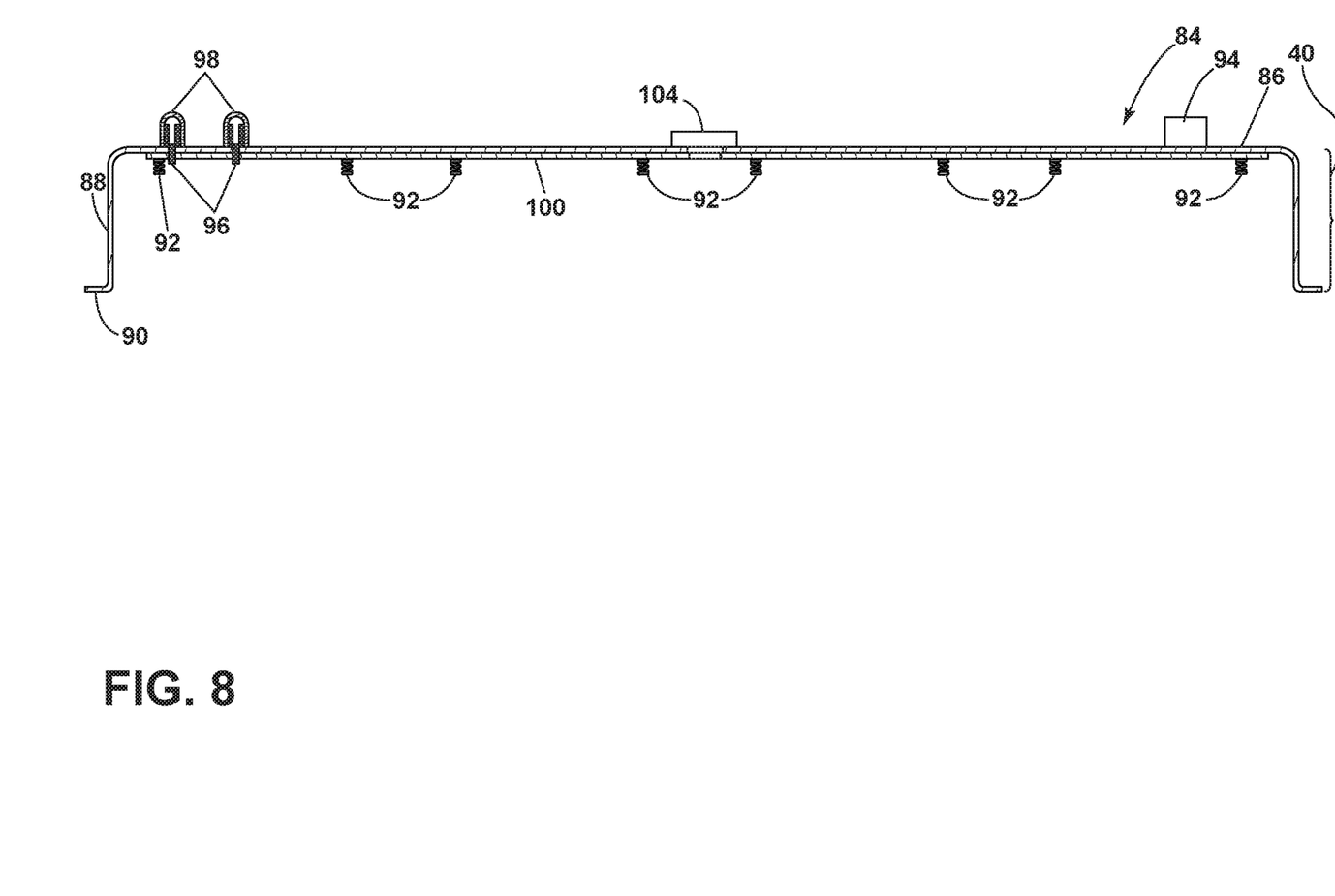
FIG. 8 is a cross-sectional view of a battery pack upper assembly of the battery pack of FIG. 2.

FIG. 8 illustrates a cross-sectional view of the battery pack upper assembly 40 of the battery pack 20. The battery pack upper assembly 40 comprises a battery pack upper housing 84 that can serve as a cover portion for the battery pack 20. The battery pack upper housing 84 can be formed from any suitable material, including a non-conductive material or a metal. The battery pack upper housing 84 defines a top 86 that serves as a cover for the bricks 50. An upper housing sidewall 88 extends downwardly from the top 86, at an angle generally perpendicular to the top 86. An upper housing flange 90 extends generally horizontally outward from the upper housing sidewall 88. The battery pack upper housing 84 can further comprise, if desired, a fan 104, a power supply input for recharging, and/or a communications port 94. It will be understood that these features can be optionally included with the battery pack upper housing 84 as needed, and that these features can be included all together, individually, in any combination, or not included at all.

The battery pack upper assembly 40 further comprises a circuit board 100 that is attached underneath the top 86 of the battery pack upper housing 84. The circuit board 100 serves to provide overall control for the battery pack 20. The circuit board 100 can include, but is not limited to, the control electronics for the battery pack 20, communication interfaces, communication circuitry, a power supply unit for the recharging circuits, as well as providing an interface for brick 50 interconnectivity. The interconnectivity of the bricks 50 is what defines the overall output voltage and total current capacity of the battery pack 20. The total output voltage of the battery pack 20 is not available until the bricks 50 are in electrical contact with the circuit board 100. The circuit board 100 further comprises brick connectors 92. The brick connectors can be, by way of non-limiting example, spring-loaded connections, push-fit connectors, foam, or slider connectors. The circuit board 100 can further comprise power terminals 96 that are capable of transmitting high voltage. The power terminals 96 can extend from the circuit board 100 and through the top 86 of the battery pack upper housing 84. Shrouds 98 can be provided that cover the power terminals 96. In an exemplary embodiment, the shrouds 98 are fitted to the power terminals 96 such that contact cannot be made with the power terminals 96 while the shrouds 98 are in place. It will be understood that, regardless of the material used to form the battery pack upper housing 84, the battery pack upper housing 84 is electrically isolated from the circuit board 100 and the power terminals 96 such that the battery pack upper housing 84 does not carry or transmit any of the voltage of the battery pack 20.

Figure 9:
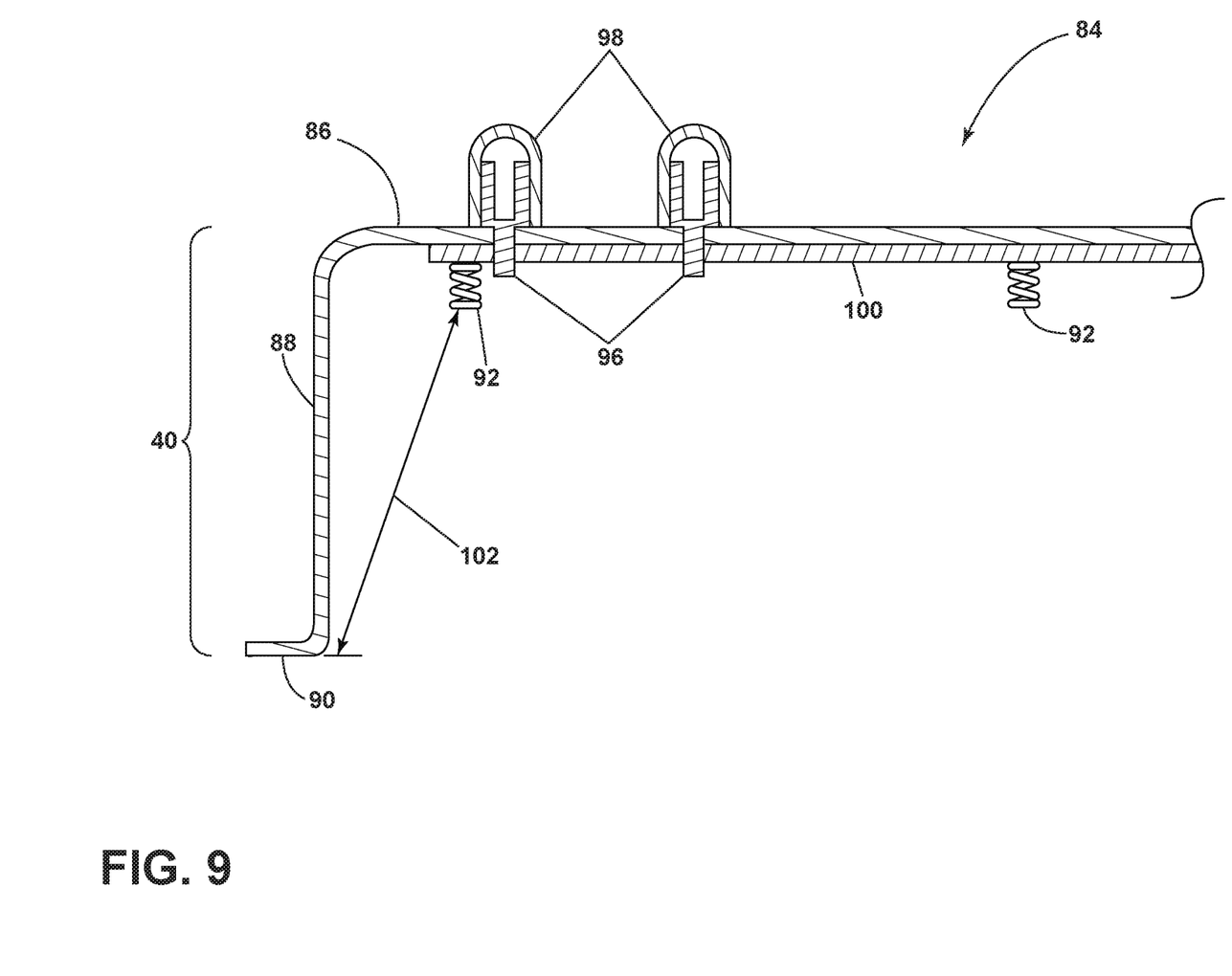
FIG. 9 is an enlarged cross-sectional view of a portion of the battery pack upper assembly of FIG. 8.

FIG. 9 illustrates an enlarged cross-sectional view of a portion of the battery pack upper assembly 40, showing the portion of the battery pack upper housing 84 that includes the power terminals 96 in greater detail. When the bricks 50 are brought into physical contact with the brick connectors 92, the circuit board 100 and the power terminals 96 can transmit the full voltage of the battery pack 20. As described previously, the total voltage of the battery pack 20 can be classified as high voltage, such as 288 volts, by way of non-limiting example. A physical separation distance 102 can be provided between the brick connectors 92 and the lowermost portion of the upper housing sidewall 88, from which the upper housing flange 90 extends generally horizontally outwardly. By way of non-limiting example, the physical separation distance 102 can be within a range of 25 millimeters to 125 millimeters. In an exemplary embodiment, the physical separation distance 102 can be at least 75 millimeters, though the physical separation distance 102 could be greater than 75 millimeters as desired.

Turning now to the method of assembly of the battery pack 20, the battery pack upper assembly 40 and the battery pack lower assembly 30 are first assembled separately. The battery pack upper assembly 40 and the battery pack lower assembly 30 can be assembled either simultaneously, or sequentially, so long as the two assemblies 30, 40 are completely assembled prior to being brought into contact with one another. When the battery pack lower assembly 30 and the battery pack upper assembly 40 are brought together, specifically when the negative terminals 52 and the positive terminals 54 of the bricks 50 are brought into physical contact with the brick connectors 92, the battery pack 20, along with the power terminals 96, achieves its total voltage, which can be hazardous to an operator or assembler. Both the shrouds 98 and the physical separation distance 102 are employed to ensure the safety of any persons nearby during the assembly process of the battery pack 20. The shrouds 98 ensure the safety of an operator by preventing physical contact with the power terminals 96. The physical separation distance 102 further ensures the safety of an operator because the physical separation distance 102 is selected to ensure that when the bricks 50 come into physical contact with the brick connectors 92, the physical separation distance 102 is sufficiently large that it is not possible for an operator to have physical contact with the brick connectors 92 from an exterior of the battery pack 20 as defined by the battery pack upper housing 84, such as by having a finger within the interior of the battery pack 20 as defined by the battery pack upper housing 84.

Once the battery pack upper assembly 40 and the battery pack lower assembly 30, more specifically battery pack upper housing 84 and the battery pack lower housing 70, have been brought into physical contact with one another, the battery pack upper housing 84 and the battery pack lower housing 70 can be secured together in order to form the fully assembled battery pack 20. In an exemplary embodiment, the battery pack upper housing 84 and the battery pack lower housing 70 can be secured together by securing the upper housing flange 90 to the lower housing flange 76. The flanges 76, 90 can be secured to one another by any suitable attachment means, including, but not limited to, the use of a physical fastener such as a screw or a bolt, an adhesive, or a snap fit attachment method. Further testing of the battery pack 20 can be performed once the battery pack 20 is fully assembled in order to ensure conformance to all requirements and standards.

With the continual upgrading of aircrafts, there is a requirement for more power, including high voltage battery packs 20, in order to power the necessary number of components and features of the aircraft. However, the manufacture and assembly of such high voltage battery packs 20 can provide hazards to an operator during the assembly process once the high voltage of the battery pack 20 is achieved. The aspects of the present disclosure allow for the safe assembly of a high voltage battery pack 20 wherein the physical aspects of the battery pack 20 are designed so as to provide increased safety to an operator during the assembly process.

Further, the use of the bricks 50 as the building unit for the battery pack 20 allows for the bulk of the testing to be carried out at a safe voltage level of an individual brick 50. Additionally, the use of bricks 50 allows for flexibility in the specifications of battery packs 20 that can be formed from the bricks 50, so a variety of battery packs 20 with a variety of voltage and current capacity requirements can be formed from this method. In addition, the design of the battery pack 20 can be used with a variety of different batteries having the same energy capacity, but with differing voltages, allowing for further flexibility and wider design choices to build the battery pack 20 to the needs and specifications of an end user.

Further still, when a brick 50 does fail or require replacement, the fitting of a replacement brick 50 will always be carried out at a non-hazardous voltage level, when the battery pack 20 has been disassembled for access to the individual bricks 50. This also means that lifting equipment for servicing a battery would no longer be needed. Previously, replacing a battery unit could require the lifting and replacement of an entire battery pack 20. The aspects of the present disclosure, however, allow for the brick 50 to be the replaceable unit, which can have a much lower weight than the entire battery pack 20.

To the extent not already described, the different features and structures of the various aspects can be used in combination with others as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the present disclosure, including the best mode, and also to enable any person skilled in the art to practice aspects of the present disclosure, including making and using any devices or systems and performing any incorporated methods. The patentable scope of the patentable disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A high voltage battery pack, comprising:
a set of battery bricks, wherein the battery bricks each have a positive and a negative terminal and each is connected in series or in parallel to an adjacent battery brick to generate a total voltage of the battery pack;
a battery pack lower assembly within which the battery bricks are attached; and
a battery pack upper assembly, the battery pack upper assembly comprising:
a battery pack upper housing; and
a circuit board connected to the battery pack upper housing, the circuit board having brick connectors attached thereto, the brick connectors positioned to come into physical contact with the positive and negative terminals of the battery bricks to generate the total voltage of the battery pack;
wherein the battery pack upper housing defines a physical separation distance between the brick connectors and an exterior of the battery pack upper housing, wherein the physical separation distance is within a range of 25 millimeters to 125 millimeters.

2. The battery pack of claim 1 wherein the battery pack upper housing comprises a top, an upper housing sidewall extending downward from the top and generally perpendicular to the top, and an upper housing flange extending outward from the upper housing sidewall and generally perpendicular to the upper housing sidewall.

3. The battery pack of claim 2 wherein the physical separation distance is provided between the brick connectors and a lowermost portion of the upper housing sidewall, from which the upper housing flange extends.

4. The battery pack of claim 3 wherein the physical separation distance is selected to ensure operator safety during assembly of the battery pack.

5. The battery pack of claim 3 wherein the physical separation distance is selected to be sufficiently large that it prevents an operator from having physical contact with the brick connectors when the battery bricks come into physical contact with the brick connectors.

6. The battery pack of claim 3 wherein the physical separation distance is at least 75 millimeters.

7. The battery pack of claim 1 wherein the voltage generated by each battery brick is roughly 28.8 volts.

8. The battery pack of claim 7 wherein the total voltage of the battery pack is roughly 288 volts.

9. The battery pack of claim 1 wherein each battery brick comprises a set of battery cells.

10. The battery pack of claim 9 wherein the battery cells are lithium ion batteries.

11. A method of assembling a high voltage battery pack having a set of battery bricks connected in series or in parallel to generate a total voltage of the battery pack, the method comprising:
assembling the set of battery bricks to a battery pack lower housing to form a battery pack lower assembly;
assembling a circuit board having brick connectors attached thereto to a battery pack upper housing to form a battery pack upper assembly; and
joining the battery pack lower assembly to the battery pack upper assembly such that when the battery bricks come into physical contact with the brick connectors, the total voltage of the battery pack is generated;
wherein the battery pack upper housing defines a physical separation distance such that when the battery pack upper housing is placed on the battery bricks, an operator is prevented from making physical contact with the brick connectors at or after the brick connectors have come into physical contact with the battery bricks to generate the total voltage of the battery pack.

12. The method of claim 11 further comprising forming the battery pack upper housing with a top, an upper housing sidewall extending downward from the top and generally perpendicular to the top, and an upper housing flange extending outward from the upper housing sidewall and generally perpendicular to the upper housing sidewall.

13. The method of claim 12 wherein the physical separation distance is provided between the brick connectors and a lowermost portion of the upper housing sidewall, from which the upper housing flange extends.

14. The method of claim 13 wherein the physical separation distance is selected to ensure operator safety during assembly of the battery pack.

15. The method of claim 13 wherein the physical separation distance is selected to be sufficiently large that it prevents an operator from having physical contact with the brick connectors when the battery bricks come into physical contact with the brick connectors.

16. The method of claim 13 wherein the physical separation distance is at least 75 millimeters.

17. The method of claim 11 wherein the voltage generated by each battery brick is roughly 28.8 volts.

18. The method of claim 17 wherein the total voltage of the battery pack is roughly 288 volts.

19. The method of claim 11 further comprising assembling a set of battery cells to form each battery brick.

20. The method of claim 19 wherein each battery cell is a lithium ion battery.

* * * * *